United States Patent
Blatter et al.

(10) Patent No.: US 6,952,926 B2
(45) Date of Patent: Oct. 11, 2005

(54) METHOD FOR STARTING UP AND LOADING A COMBINED POWER PLANT

(75) Inventors: Richard Blatter, Schaffhausen (CH); Peter Mueller, Huettikon (CH); Stephan Hepner, Althaeusern (CH)

(73) Assignee: Alstom Technology Ltd., Baden (CH)

( * ) Notice: Subject to any disclaimer, the term of this patent is extended or adjusted under 35 U.S.C. 154(b) by 181 days.

(21) Appl. No.: 10/416,486

(22) PCT Filed: Nov. 12, 2001

(86) PCT No.: PCT/IB01/02133
§ 371 (c)(1),
(2), (4) Date: Oct. 9, 2003

(87) PCT Pub. No.: WO02/38919
PCT Pub. Date: May 16, 2002

(65) Prior Publication Data
US 2004/0045299 A1 Mar. 11, 2004

(30) Foreign Application Priority Data
Nov. 13, 2000 (DE) .......... 100 56 231

(51) Int. Cl.⁷ .............. F02C 6/18; F02C 7/26
(52) U.S. Cl. ................ 60/778; 60/39.182
(58) Field of Search .......... 60/39.182, 772, 60/778, 786

(56) References Cited
U.S. PATENT DOCUMENTS 5,148,668 A * 9/1992 Frutschi ........ 60/39.182
5,203,160 A    4/1993 Ozono .......... 60/39.02
5,682,737 A * 11/1997 Schmidli ....... 60/39.182
5,737,912 A *  4/1998 Krakowitzer ... 60/39.182

FOREIGN PATENT DOCUMENTS

| DE | 195 18 093 A1 | 11/1996 |
| EP | 0 605 156 A2  | 7/1994  |
| EP | 1 072 760 A1  | 1/2001  |

OTHER PUBLICATIONS

Search Report from DE 100 56 231.0 (Sep. 1, 2003).
Search Report from PCT/IB01/02133 (Feb. 12, 2002).

* cited by examiner

*Primary Examiner*—Louis J. Casaregola
(74) *Attorney, Agent, or Firm*—Cermak & Kenealy, LLP; Adam J. Cermak

(57) ABSTRACT

When loading a power station in a grid without any energy, this power station must be able to cover all the short-term power requirements, and at the same time to keep the grid frequency within a permissible tolerance band. The invention specifies a method of providing this capability by means of an efficient combination system. According to the invention, the gas turbine (1) is loaded in a lower power range such that it is controlled in accordance with a predetermined load program, without having to react to load transients in the grid (50). Before the power station is connected to the grid, the heat recovery steam generator (5) is heated up as an energy store, and a steam turbine (2) is raised at least to its rated rotation speed, with the steam control valves (9, 15) being highly restricted. The steam turbine reacts in the event of short-term load requirements from the grid, which cannot be covered by the gas turbine.

6 Claims, 1 Drawing Sheet

METHOD FOR STARTING UP AND LOADING A COMBINED POWER PLANT

TECHNICAL FIELD

The invention relates to a method for operating a combined cycle power station. It relates in particular to a method for starting and loading a combination system. This method relates especially to power control and to power sharing within the combination system, when loading the combination system within an black electrical grid.

PRIOR ART

When an electrical grid without any energy (black grid) is brought into use once again, particular requirements are placed on the capabilities of a power station to react quickly to load transients and to support the frequency. When loading a grid, and when the loads are connected successively, the grid load does not rise continuously but, for example when an industrial concern with a large number of electric-motor loads is connected, sudden changes occur in the real power requirement and in the wattless component requirement of from several hundred kilowatts up to the order of magnitude of megawatts. Even if these sudden load changes are considered to be small in absolute terms, they must nevertheless be covered by a single power station. If the total power consumption of the grid is only a few megawatts, for example 5 MW, then the requirements which are placed on the control system quality and the capability to support the frequency in the lower partial load range of a power station in these conditions become clear.

In principle, these requirements can be covered very well by a gas turbine system, which intrinsically has short response times. Nevertheless, the development toward the use of modern premixed burner technology with low hazardous emission levels in gas turbines has led, at least in the lower load range, to a limitation to the possible load gradients, for reasons of flame stability. In addition, some of these modern types of gas turbines cannot operate in certain power bands, which normally have a width of several megawatts.

Thus, according to the prior art, special units must be provided in the electricity budget which are able to cover the requirements for restarting an electrical grid without any energy. It is thus possible in this case to provide appropriate capacities in the form of peak-load gas turbines and diesel units. However, these are frequently comparatively uneconomic systems which produce high emission levels and which otherwise are operated for only short times. A high maintenance penalty is involved in maintaining their starting availability, for very rare operation down to them being effectively permanently stationary. Furthermore, the investments are not amortized via the electrical power that is sold.

Thus, according to the prior art, the provision of the appropriate reserves is highly costly overall. On the other hand, in the liberalized electricity markets in particular, power station operators can receive large amounts of money from the grid operators, to provide these black starting capacities.

DESCRIPTION OF THE INVENTION

For the power station operators, the above statements result in the aim of providing the appropriate black starting capacities by means of modern, economic systems which are operated continuously.

The object of the present invention is thus to specify a method which allows a frequency supporting capability to be provided for any given system load by means of a combination system which is based on a modern gas turbine equipped with low-emission premixing burner technology.

According to the invention, this object is achieved in that, for a method for operating a combined cycle power station when starting up an electrical grid without any energy, a water-steam circuit is charged with energy and a steam turbine is started before the grid is loaded, and the gas turbine is loaded at least in a part of its load range in accordance with a predetermined load program, with transient load requirements in the grid being covered by changes in the steam turbine power.

In this context, the expression charging the water/steam circuit with energy means, for example, heating up the water/steam circuit. On the other hand, this may also comprise a successive increase in the fresh steam pressure in the boiler, or successive charging of a container with a steam volume. A pressurized volume of water close to its boiling point likewise represents a very efficient energy reservoir, which has the capability to provide large amounts of steam spontaneously by reducing the pressure. Normally, a combination of these options is used for the implementation of the idea of the invention, although those skilled in the art will also be familiar with other possible ways of operating a water/steam circuit as an energy store.

The essence of the invention is thus not, as is normal in the prior art, to control the supply of fresh steam to the steam turbine such that the thermal stresses in the steam turbine are limited, but actually also to use the fresh steam supply for power control in the starting phase. In this case, mechanical overloading of the steam turbine on a temporary basis is deliberately accepted, although this reduces the life. Nevertheless, an event such as this occurs only rarely in practice, and the probability of a combination system actually being operated in accordance with the method according to the invention is intrinsically very low. Nevertheless, it is important for the system to be prepared for the operating method according to the invention, and for the appropriate programs to be implemented in the control technology which, as mentioned above, can in its own right generate considerable cash flows.

In the method according to the invention, it is advantageous for as much energy as possible to be stored in the water/steam circuit so that it can be made available at short notice in the form of steam for the steam turbine. It is thus advantageous for the method for the gas turbine first of all to be operated with the grid switch open once the gas turbine has been accelerated to its rated rotation speed, but with the generator switch closed in island operation in order to provide the in-house supply for the combined cycle power station. During this period, the exhaust gas heat from the gas turbine is used to charge the water/steam circuit with energy and to make it ready for operation. It is advantageous for the steam turbine to have already been started at this time. The grid switch is closed only when the water/steam circuit has reached a specific state. Only then need the combined cycle power station cover the power requirements of the grid; on the basis of the method according to the invention, the water/steam circuit and the steam turbine are now ready to assist the gas turbine in covering transient load requirements, by supplying steam to the steam turbine. It is also advantageous for further holding points to be provided in the load program, at which the water/steam circuit is successively charged with further energy. This further increases the steam turbine power that is available at short notice.

The water/steam circuit in the method according to the invention is operated as an accumulator for thermal energy which can be made available quickly in the form of hot, compressed steam.

If the combination system is provided with a drum boiler, a high-pressure drum and/or a low-pressure drum may be used as energy stores. In a system for carrying out the method, the drums may advantageously be derated as energy stores. Saturated water is then stored in the drums, as well as steam. In one preferred method variant, in which steam must be supplied when a power demand is made on the steam turbine, and a main control valve that is arranged between the boiler and the steam turbine is opened, the backpressure in the boiler falls spontaneously by a small amount. The saturated water boils, and is thus able to provide large amounts of steam quickly.

In a further advantageous refinement of the method, steam is passed at least at times from the high-pressure section of the steam generator to the low-pressure section or medium-pressure section of the steam turbine. This is done either by temporarily reducing the pressure in the high-pressure section of the steam generator or by restricting the pressure between the steam generator and the steam turbine. One advantage of this method variant is that the moisture in the steam does not rise excessively during the expansion in the steam turbine and when the fresh steam temperature is low with a low gas turbine load.

The steam turbine may, of course, also be supplied with additional steam from an auxiliary boiler.

In addition, the power of a black starting diesel may also be used to compensate for transient load requirements.

BRIEF DESCRIPTION OF THE DRAWING

The invention will be explained in more detail in the following text with reference to the drawing. The single FIGURE shows an example of a combination system with a black starting capability. A water/steam circuit and electrical circuits are shown in highly schematic form, and only those elements which are directly necessary for understanding of the invention are illustrated. The FIGURE shall be regarded as being purely instructive and it should therefore not be used in particular to constrict the claimed scope of protection of the invention.

APPROACH TO IMPLEMENTATION OF THE INVENTION

Figure 1:
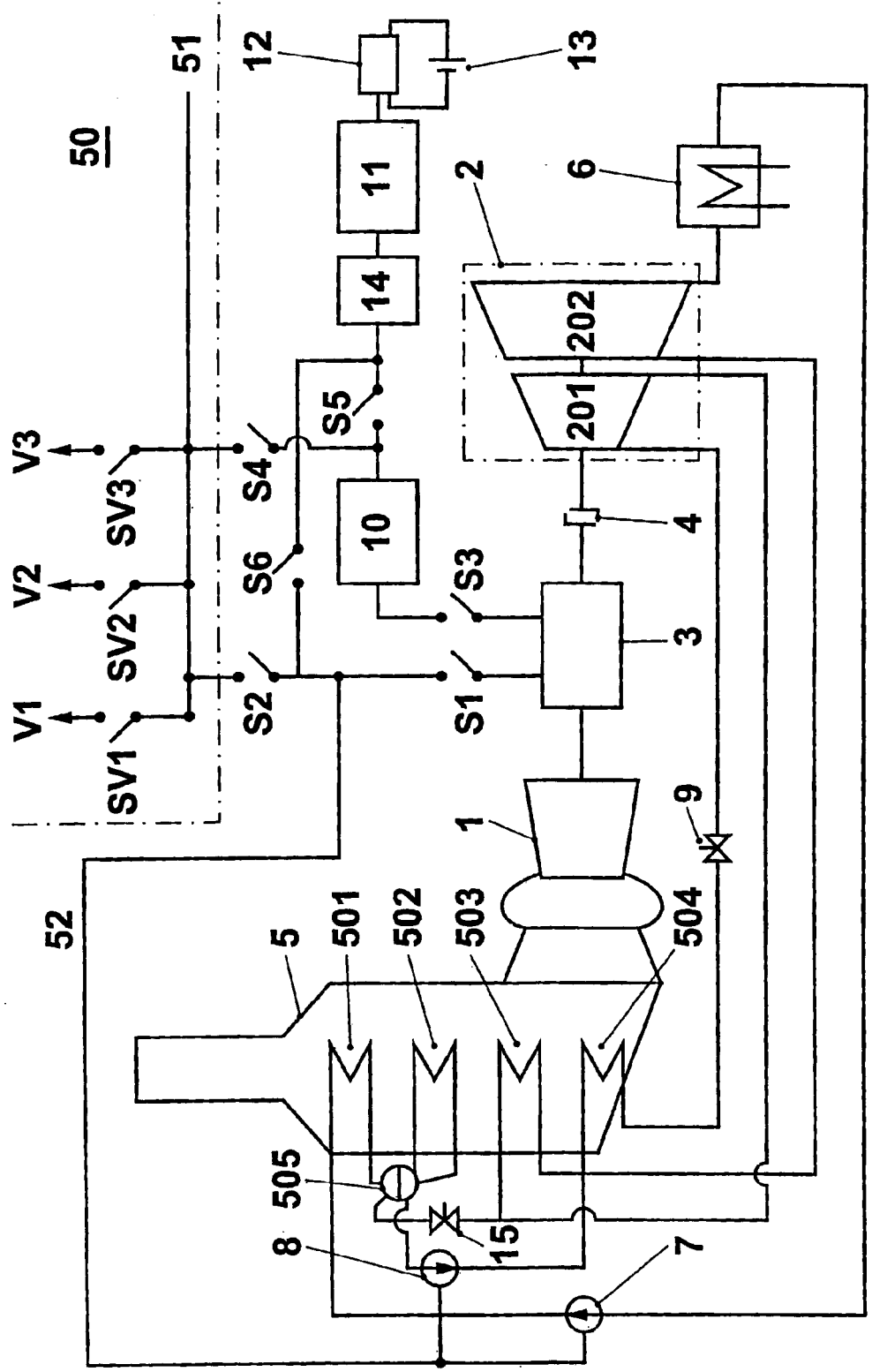

The FIGURE shows, by way of example, a combination system with black starting capability, with reference to which the method according to the invention will be explained in the following text. A gas turbine 1 and a steam turbine 2 drive a common generator 3. In this case, the steam turbine 2, which comprises a high-pressure housing 201 and a medium-pressure/low-pressure housing 202, is coupled in a manner known per se via an automatically acting clutch 4 to the generator 3. The exhaust gas from the gas turbine flows through a heat recovery steam generator 5, in which steam is generated from the steam turbine. In this case, condensate from a condenser 6 is raised to a first pressure level by a low-pressure/medium-pressure feed pump 7. This feed water flows through a feed water preheater 501, and flows into a low-pressure/medium-pressure drum 505. Water from the low-pressure/medium-pressure drum 505 circulates through a low-pressure/medium-pressure evaporator 502, and is separated into boiling water and saturated steam in the drum 505. Some of the boiling water circulates further through the low-pressure/medium-pressure evaporator 502, where some of it is evaporated in each case. Another flow element of the boiling water in the drum is raised to a second pressure by a high-pressure feed pump 8. The high-pressure feed water is evaporated in a positive flow evaporator 504, and the resultant steam is superheated. The high-pressure steam finally flows via a steam control valve 9 to the inlet connection of the high-pressure housing 201 of the steam turbine 2, where it is expanded, with useful power being produced, to a pressure which corresponds approximately to the first pressure level in the water/steam circuit. The saturated steam which is deposited in the drum flows out of the drum and is mixed with the partially expanded first flow element before it is passed to a low-pressure/medium-pressure superheater. From there, the superheated steam is passed to the inlet connection of the low-pressure/medium-pressure housing 202 of the steam turbine, and is expanded to the condenser pressure, with useful power being emitted. Finally, the expanded steam is liquefied again in the condenser 6. The water/steam circuit described above is illustrated in highly simplified form. It could likewise be constructed differently in terms of the number of pressure stages, preheating stages and evaporator types, without affecting the idea of the invention. In particular, the low-pressure/medium-pressure evaporator could be in the form of a positive flow evaporator and superheater. The boiler could also be designed with a high-pressure drum. A large number of further variations will be familiar to those skilled in the art. During normal operation of the system, the generator switch S1 and the grid switch S2 are closed, while the switches S3 to S6 are open. The power station is connected to the electrical grid 50 via the grid switch S2. This is generally a large grid, to which a large number of further power stations and a large number of loads V1, V2, V3, ... are connected, which are switched on and off via switches SV1, SV2, SV3, ... The exemplary embodiment indicates that the power station is connected via the grid switch S2 to a high-voltage rail 51, and that a number of loads can be connected to this rail via switches. Apart from this, the electrical circuitry is illustrated in a highly schematic form; transformers, circuit breakers and further elements which are not essential for immediate understanding of the invention are omitted. A high-power electrical grid is generally very insensitive to fluctuating power demands, and power stations which are running under load have appropriate reserves for frequency support in their own right.

When the power station is started up in the normal way, the switches S1, S2, S5 and S6 are opened first of all. The switch S4 is closed, and a starting apparatus 10, for example a static frequency converter, is connected to the high-voltage rail 51. The starting apparatus 10 is connected via the switch S3 to the generator 3, which is now operated as a motor, and the gas turbine is first of all accelerated to its self-sustaining rotation speed and remains in operation up to a certain rotation speed in order to assist the shaft acceleration. The switches S3 and S4 are opened at the latest when the gas turbine reaches its rated rotation speed, and the gas turbine runs on no load. The switch S1 is closed, and the power station can be supplied by the generator via the in-house supply rail 52, with the system now having the capability to run in an island mode, without any external power supply. By way of example, the illustration shows here that the feed pumps 7 and 8 are connected to the in-house supply rail 52. In a next step, the power station is synchronized to the grid, and the grid switch S2 is closed. The power from the gas turbine is increased in a controlled manner, at least in a lower load range, in accordance with a predetermined load program. The steam turbine 2 is started up; as soon as it reaches its rated rotation speed, it is connected to the generator via the automatically acting clutch 4. The steam control valve 9 increases the amount of steam slowly in accordance with a predetermined load program for the steam turbine and/or as a function of measured material temperatures, in order to limit the mechanical load on the steam turbine caused by thermal stresses. In this way, the combination system is driven to produce a predetermined power requirement irrespective of the grid load; the frequency support for the grid 50 is provided by other systems which are connected to the grid.

The situation is fundamentally different when there is no energy in the grid 50. In this case, the black starting capability of a system which can be connected to the grid 50 is required. For this purpose, the combined cycle power station illustrated by way of example is equipped with a black starting diesel 11. The switches S1 to S6 are opened. The black starting diesel 11 is started using a starter motor 12, which is supplied from a battery 13. The black starting diesel 11 drives an auxiliary generator 14. The switch S5 is closed, and the starting apparatus 10 is supplied from the auxiliary generator 14. As described above, the switch S3 is closed, and the gas turbine 1 is accelerated to its rated rotation speed. The switches S3 and S5 are then opened. Before the gas turbine is started, the auxiliary generator 14 is connected to the in-house supply rail 52 by means of the switch S6. This makes it possible to ensure that the boiler is ready to start. The feed pumps 7 and 8 may be started up for this purpose. The condenser 6 is also evacuated as soon as possible. Once the gas turbine is running at its rated rotation speed without any load, the black starting diesel 11 initially, in one preferred variant, remains idle, or at a small load, which supplies electrical power to the most necessary power station components. The generator switch S1 is closed, and the generator 3 which is driven by the gas turbine 1 supplies the power for the in-house supply for the power station. The power station is now running independently of any external or auxiliary power supply, autonomously in an island mode. If the feed pumps 7 and 8 have not yet been started, they are now started, and the condenser 6 is evacuated. In the island mode, the heat recovery steam generator 5 is heated up as much as possible, and the steam production process is started. The steam control valves 9 and 15 are closed, or are greatly restricted. When an adequate steam state is reached, the steam turbine is accelerated to its rated rotation speed. The switch S2 is then closed, and the power station is connected with a minimum power load to the high-voltage rail 51 of the grid 50, and feeds electrical power into the grid 50 which, until this point, has had no energy in it. Most of the load switches SV1, SV2, SV3, . . . are open; in this case, the loads may also be entire grid segments. The power from the power station is increased slowly. Loads must, of course, be connected in a comparable way such that the power demand on the grid corresponds at least approximately to the generator power; the system responds to small discrepancies by fluctuations in the grid frequency, to which the power station must react with power changes in order to keep the grid frequency within a tolerable range. The loads V1, V2, V3, . . . , which are connected successively, are not infinitesimal and, particularly in the starting phase of the grid load, are invariably significant relative to the total power. At a first moment, the rotating inert masses of the power station damp the load fluctuations before they can be regulated out by varying the useful power emitted from the turbines. According to the previous prior art, the gas turbine line control acts in order to support the frequency in response to certain load changes. As mentioned initially, this is not always possible with modern gas turbines, at least in a lower load range up to, for example, 40% or 50% of the relative gas turbine load; the load requirement could also fall into an unacceptable gas turbine power range. To a person skilled in the art, the expression relative gas turbine load or gas turbine power in fact means the ratio of the currently emitted useful power from the gas turbine to its maximum power at that time, and this is highly dependent on environmental conditions and the operating parameters of the gas turbine. According to the invention, the steam turbine is being operated at its rated rotation speed, at a low power or on no load. The valves 9 and 15 are highly restricted. Energy is stored in the heat recovery steam generator 5 in the form of hot, pressurized water and steam. In one preferred embodiment, the low-pressure/medium-pressure drum 505 is derated, and acts as an additional store for boiling water. This could in principle also be achieved by means of a high-pressure drum; in practice, however, a high-pressure reservoir of appropriate size results in relatively major problems, particularly with regard to the strength. The energy which is stored in the drum in the form of boiling water can be used by opening the control valve 15: the drop in the backpressure causes this water to evaporate, and the saturated steam that is produced is superheated in the superheater 503, and is supplied to the medium-pressure/low-pressure turbine. In the same way, the steam control valve 9 is opened, and the power emitted from the high-pressure steam turbine 201 likewise rises spontaneously. Although a procedure such as this produces thermal shocks and increases the thermal stresses within the steam turbine components, thus considerably shortening the life in some circumstances, this can invariably be tolerated, however, if the described method allows problem-free starting of an electrical grid with no energy in it, without the risk of emergency disconnections of the power station resulting from excessively low or high frequencies. To this extent, it is also preferable for the steam turbine to be operated under load as early as possible during the process of starting the electrical grid, in order that the steam turbine power control can react in both directions, that is to say not only when there is a threat of an excessively low frequency but also when there is a threat of an excessively high frequency. The gas turbine power is increased, controlled in accordance with a predetermined load program. During the starting process, the gas turbine does not react to load fluctuations, at least in a lower load range. The frequency support, that is to say the compensation for transient sudden load changes, is carried out by the steam turbine in the described manner. It is advantageous in this case for the load program for the steam turbine to include a number of holding points, at which the heat recovery steam generator is charged with further energy as an energy store, which improves the short-notice power potential of the steam turbine. In a further preferred method variant, the switch S6 is closed. In this case, the power of the black starting diesel can then also be used for frequency support. Once the gas turbine line has reached a specific limit value—values above around 40% of the relative power, and preferably more than 50% of the relative power, are typical—the gas turbine is able to react to short-term changes in the power demand. In consequence, the gas turbine is now no longer loaded in a controlled manner but is operated in a regulated manner for frequency support, and, if required, is loaded further up to its maximum power. The steam turbine is removed from the control process, and is loaded conventionally, slowly, and avoiding excessive thermal stresses. The load is distributed between the gas turbine and the steam turbine from then on in accordance with a specific system operating concept. Furthermore, any diesel which is still being operated can also be stopped.

In a further method variant, it is possible to provide, if the boiler temperatures are low, for steam to be supplied from the high-pressure section 504 of the heat recovery steam generator to the low-pressure/medium-pressure section 202 of the steam turbine, for which purpose the pressure which the high-pressure feed pump 8 supplies is temporarily reduced, in a particularly advantageous manner. One major advantage is that the moisture in the steam in the steam turbine does not rise excessively when the exhaust gas temperature, and hence the fresh steam temperature, are low. The steam lines and restriction and shut-off devices required for this purpose are not shown in the FIGURE, for reasons of clarity. However, based on knowledge of the present description, a person skilled in the art will be able without any problems to implement this variant of the invention in an appropriately constructed combination system.

In addition to the specific requirement in the exemplary embodiment, a wide range of further system forms will be evident without any effort to the average person skilled in the art, by means of which the invention can be implemented; in particular, the described water/steam circuit does not represent any restriction: those skilled in the art will be directly familiar with a large number of different embodiments; advantageous method variants which, although not described explicitly, are still within the scope of the invention as it is characterized in the claims, result herefrom within the scope of the idea of the invention.

LIST OF REFERENC SYMBOLS

1 Gas turbine
2 Steam turbine
3 Generator
4 Automatically acting clutch
5 Heat recovery steam generator
6 Condenser
7 Feed pump
8 High-pressure feed pump
9 Steam control valve
10 Starting apparatus
11 Black starting diesel
12 Starter
13 Battery
14 Auxiliary generator
15 Steam control valve
50 Grid
51 High-voltage rail
52 In-house supply rail
201 High-pressure housing
202 Low-pressure/medium-pressure housing
501 Feed water preheater
502 Low-pressure/medium-pressure evaporator
504 High-pressure evaporator and superheater
505 Low-pressure/medium-pressure drum
S1 Generator switch
S2 Grid switch
S3 Switch
S4 Switch
S5 Switch
S6 Switch
SV1 Load switch
SV2 Load switch
SV3 Load switch
V1 Load
V2 Load
V3 Load

What is claimed is:

1. A method for operating a combined cycle power station upon starting up an electrical black grid, comprising:

heating up a water/steam circuit and starting a steam turbine before the grid is charged with a load; and loading a gas turbine at least in a part of its load range in accordance with a predetermined load program;

changing the steam turbine power to cover transient load requirements in the grid.

2. The method as claimed in claim 1, comprising:

operating the gas turbine for a time period on idle operation or at a power level for supplying the combined cycle power station's own power supply requirements before being connected to the grid; and charging the water/steam circuit with energy during said time period.

3. The method as claimed in claim 1, comprising:

providing at least one holding point in the load program for the gas turbine; and charging the water/steam circuit with further energy at the holding point.

4. The method as claimed in claim 1, comprising:

temporarily supplying steam from a high-pressure section of a hear recovery steam generator to a low-pressure section, a medium-pressure section, or both, of the steam turbine.

5. The method as claimed in claim 1, comprising:

storing steam energy with at least one drum of a heat recovery steam generator.

6. The method as claimed in claim 1, further comprising:

covering transient load requirements of the grid with the power of a black starting diesel in addition to the steam turbine power.

* * * * *